UNITED STATES PATENT OFFICE.

EMILE DÉNORUS, OF PARIS, FRANCE, ASSIGNOR TO CHARLES WEBER, OF SAME PLACE.

PROCESS OF METALLIZATION.

SPECIFICATION forming part of Letters Patent No. 491,799, dated February 14, 1893.

Application filed March 23, 1892. Serial No. 426,149. (No specimens.) Patented in England November 25, 1886, No. 15,403, and in France February 11, 1891, No. 198,171.

*To all whom it may concern:*

Be it known that I, EMILE DÉNORUS, a citizen of the Republic of France, residing at Paris, in said Republic, have invented an Improved Process of Metallization, (for which I have obtained a patent in France dated February 11, 1891, No. 198,171, and in Great Britain under date November 25, 1886, No. 15,403, as a communication from the Société Anonyme de Métallisation Artistique des Animaux, Végétaux ou Auteurs Corps,) of which the following is a specification.

My improved process has for its object, the preparation of organic and other material, with a view of applying a metallic surface thereto by electro deposition, or otherwise. The essential feature in the said process consists in the preparation of an albuminous liquid to be preliminarily applied to the surface of a material, which it is desired to render metallic.

In preparing said albuminous liquid, I take snails, which have been previously washed in ordinary water to free them from calcareous and other earthy matter, and they are immersed in a vessel containing distilled water, in which they are left long enough to secure the solution of the albuminous elements. The albumen solution thus obtained, after being filtered, is boiled for about one hour. To this liquid is then added a small quantity of filtered water with the object of replacing that lost by evaporation and then three per cent. of nitrate of silver is added. The solution thus formed, when hermetically sealed in closed bottles and kept in a dark place, can be perfectly preserved for an indefinite period.

In using this solution it is mixed with distilled water in quantities of thirty per cent. of the former with about seventy per cent. of the latter. The materials or substances which are to be metallized are either dipped in this solution, or the same applied thereto, in either event for a period of some minutes, and are then immersed in a bath of distilled water containing twenty per cent. of dissolved nitrate of silver, and immediately thereafter exposed to the action of hydric sulphide, the latter having the effect of reducing the nitrate retained on the surface of the object by the albuminous solution. As thus treated, the organic or other material is in a favorable condition for being metalized, or subject to electro deposition. The galvanic products obtained by this process are much superior in their finish and appearance to those heretofore secured, inasmuch as the smaller fibers and veins, or any natural surface or irregularity usually imperceptible to the naked eye are disclosed with a remarkable clearness. Moreover, the metallic stratum or finish, is uniform and equal throughout, and has a perfect adhesion.

My process can be applied to materials and substances in general, but is especially useful in connection with articles made from material of animal or vegetable origin, for instance, highly pleasing effects are secured when the process is used in connection with wood, silk, hair, and all threads and tissues of animal origin, and likewise feathers. It can also be applied to insects and animals of all sorts, and to anatomical pieces, which not only have their effect increased, but are consequently much better preserved.

I claim—

1. A solution for use in connection with metallizing or electro plating process consisting of snail albumen and nitrate of silver, substantially as described.

2. The described process consisting in applying to or immersing in a solution of snail albumen and nitrate of silver the article to be coated, immersing the same in a bath of distilled water and dissolved nitrate of silver subjecting the article to the action of a reducing gas and finally subjecting the article to the coating step, substantially as described.

In testimony whereof I have signed this specification in the presence of two subscribing witnesses.

EMILE DÉNORUS.

Witnesses:
ROBT. M. HOOPER,
JOSEPH TOURNIER.